(12) United States Patent
Erben et al.

(10) Patent No.: US 8,978,837 B2
(45) Date of Patent: Mar. 17, 2015

(54) DISC BRAKE FOR A MOTOR VEHICLE AND HOUSING FOR THE SAME

(75) Inventors: Ralf Erben, Kemmenau (DE); Michael Herberts, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 340 days.

(21) Appl. No.: 12/666,321

(22) PCT Filed: Jun. 19, 2008

(86) PCT No.: PCT/EP2008/004955
§ 371 (c)(1),
(2), (4) Date: Feb. 1, 2010

(87) PCT Pub. No.: WO2009/000463
PCT Pub. Date: Dec. 31, 2008

(65) Prior Publication Data
US 2010/0187049 A1 Jul. 29, 2010

(30) Foreign Application Priority Data
Jun. 28, 2007 (DE) .......................... 10 2007 029 927

(51) Int. Cl.
*F16D 65/18* (2006.01)
*F16D 121/02* (2012.01)
*F16D 121/24* (2012.01)
*F16D 123/00* (2012.01)
*F16D 125/40* (2012.01)

(52) U.S. Cl.
CPC ............ *F16D 65/18* (2013.01); *F16D 2121/02* (2013.01); *F16D 2121/24* (2013.01); *F16D 2123/00* (2013.01); *F16D 2125/40* (2013.01)
USPC .......... 188/72.8; 188/72.6; 188/105; 188/106

(58) Field of Classification Search
USPC .......................... 188/72.6, 105, 106; 74/216.3
See application file for complete search history.

(56) References Cited

U.S. PATENT DOCUMENTS

| 4,804,073 | A | * | 2/1989 | Taig et al. ................... 188/72.1 |
| 5,348,123 | A | | 9/1994 | Takahashi et al. |
| 5,353,896 | A | * | 10/1994 | Baumgartner et al. ...... 188/71.9 |
| 6,012,556 | A | * | 1/2000 | Blosch et al. ................ 188/71.8 |
| 6,142,265 | A | * | 11/2000 | Reimann et al. ............. 188/158 |
| 6,230,855 | B1 | * | 5/2001 | Holding ........................ 188/158 |
| 6,349,801 | B1 | * | 2/2002 | Koth et al. ................... 188/72.8 |

(Continued)

FOREIGN PATENT DOCUMENTS

DE 4038032 A1 6/1992
DE 19648581 A1 5/1998
(Continued)

*Primary Examiner* — Robert A Siconolfi
*Assistant Examiner* — James Hsiao
(74) *Attorney, Agent, or Firm* — MacMillan, Sobanski & Todd, LLC

(57) ABSTRACT

The invention relates to a disc brake for a motor vehicle having a housing, a piston which is movable in the housing along a longitudinal axis and a nut-spindle arrangement which acts on the piston or can be brought into engagement with this, wherein the nut-spindle arrangement is arranged in the housing and is workingly supported via a bearing arrangement on a support surface of the housing. In order to increase the service life of the bearing arrangement, the support surface is formed by a defined contact surface which projects with respect to an adjacent housing region and against which the bearing arrangement bears.

18 Claims, 2 Drawing Sheets

(56) References Cited

U.S. PATENT DOCUMENTS

| | | | |
|---|---|---|---|
| 6,752,249 B1 * | 6/2004 | Jungbecker et al. | 188/162 |
| 7,178,645 B2 * | 2/2007 | Maehara | 188/196 P |
| 7,316,300 B2 * | 1/2008 | Danne et al. | 188/72.1 |
| 7,992,691 B2 * | 8/2011 | Maron et al. | 188/156 |
| 2005/0034935 A1 * | 2/2005 | Maehara | 188/71.9 |
| 2005/0258682 A1 * | 11/2005 | Halasy-Wimmer et al. | 303/89 |
| 2006/0054431 A1 * | 3/2006 | Gilles et al. | 188/265 |
| 2006/0131112 A1 * | 6/2006 | Hashida | 188/71.9 |
| 2006/0151260 A1 | 7/2006 | Drennen et al. | |
| 2007/0068748 A1 * | 3/2007 | Chittka | 188/72.7 |
| 2007/0158148 A1 * | 7/2007 | Ohtani et al. | 188/158 |
| 2009/0211858 A1 | 8/2009 | Leiter et al. | |
| 2009/0283371 A1 * | 11/2009 | Winkler et al. | 188/72.6 |

FOREIGN PATENT DOCUMENTS

| | | |
|---|---|---|
| DE | 102005051082 A1 | 5/2007 |
| DE | 102006056346 A1 | 6/2007 |
| EP | 1498633 A1 | 1/2005 |

\* cited by examiner

DISC BRAKE FOR A MOTOR VEHICLE AND HOUSING FOR THE SAME

CROSS-REFERENCE TO RELATED APPLICATIONS

This application is a national stage of International Application No. PCT/EP2008/004955 filed Jun. 19, 2008, the disclosures of which are incorporated herein by reference in entirety, and which claimed priority to German Patent Application No. 10 2007 029 927.5 filed Jun. 28, 2007, the disclosures of which are incorporated herein by reference in entirety.

BACKGROUND OF THE INVENTION

The present invention relates to a disc brake for a motor vehicle having a housing, a piston which is movable in the housing along a longitudinal axis and a nut-spindle arrangement which acts on the piston or can be brought into engagement with this, wherein the nut-spindle arrangement is arranged in the housing and is workingly supported via a bearing arrangement on a support surface of the housing.

Disc brakes of this kind are already known from the prior art. For example, the nut-spindle arrangement is on the one hand used for an adjusting mechanism in order to compensate for increasing wear at the brake linings so that the air gap of the disc brake can be kept largely constant. On the other hand the nut-spindle arrangement is often also used in modern brake types to implement a parking braking function in addition to compensate for wear. For this purpose the spindle is rotatably driven, so that the nut can be moved axially on the spindle. Following hydraulic biasing of the piston, in order to obtain a braking effect which is adapted to the parking braking action, the nut is moved again accordingly, so that it is again brought into contact with the piston. The piston can subsequently be hydraulically pressure-relieved. However it cannot move back into its starting position, which has no braking action, but is essentially held in the intended parking braking position via the nut of the nut-spindle arrangement. In order to prevent a rotational movement of the nut, either the mating pair of threads between the nut and the spindle is formed in a self-locking manner or the spindle is rotationally fixed.

A solution of this kind is also known, for example, from the prior art according to U.S. Pat. No. 5,348,123. It has become apparent that, in order to prevent undesirable frictional resistances, the spindle is advantageously to be mounted in the housing with low friction levels via a bearing arrangement. Hence the document U.S. Pat. No. 5,348,123 indicates the use of an antifriction thrust bearing as a bearing arrangement of this kind. However problems can occur when supporting the bearing arrangement on the housing. This is due in particular to the fact that the housing is usually made of cast material, in which case the resulting surfaces often have irregularities. If the bearing arrangement bears against an irregular surface of this kind on the housing of the disc brake, different load situations, which may adversely affect the service life of the bearing arrangement, may occur at certain points or in certain areas.

BRIEF SUMMARY OF THE INVENTION

A feature of the invention is to provide a disc brake of the type initially indicated and a housing for this which prevent the problems described above.

This features is achieved by a disc brake of the type initially indicated in which the support surface is formed with a defined contact surface which projects with respect to an adjacent housing region and against which the bearing arrangement bears.

By providing a projecting defined contact surface it is possible to prevent the bearing arrangement from bearing irregularly against the housing and thus being adversely affected with regard to its service life on account of different load situations.

The support surface of the invention is preferably formed by the end surface of a contact ring projecting from the housing in the axial direction or by a contact step. A contact ring of this kind or a contact step can be formed when the housing is produced, for example by a casting process. However it can also be produced by subsequently machining the housing, for example by applying a recess or the like. In one development of the invention in this connection the contact ring or the contact step is arranged adjacent to an undercut in the housing.

According to different embodiments of the invention, the bearing arrangement can comprise an antifriction bearing, in particular a thrust bearing. For example, it is possible for the bearing arrangement to comprise a roller, ball or needle bearing. It is also possible in this connection for the bearing arrangement to bear against the support surface with a bearing ring or a bearing disc.

In one development of the invention the support surface is the same size as or preferably smaller than the surface of the bearing ring which faces it.

In order to improve the surface quality at the support surface, in one development of the invention the support surface is formed in a plane manner, in particular by reworking. The reworking can involve removing material, for example.

The invention also relates to a housing for a disc brake of the type described above, this housing comprising a support surface for a bearing arrangement, with the support surface being formed with a defined contact surface which projects with respect to an adjacent housing region and against which the bearing arrangement bears.

Other advantages of this invention will become apparent to those skilled in the art from the following detailed description of the preferred embodiments, when read in light of the accompanying drawings.

DETAILED DESCRIPTION OF THE INVENTION

Figure 1:
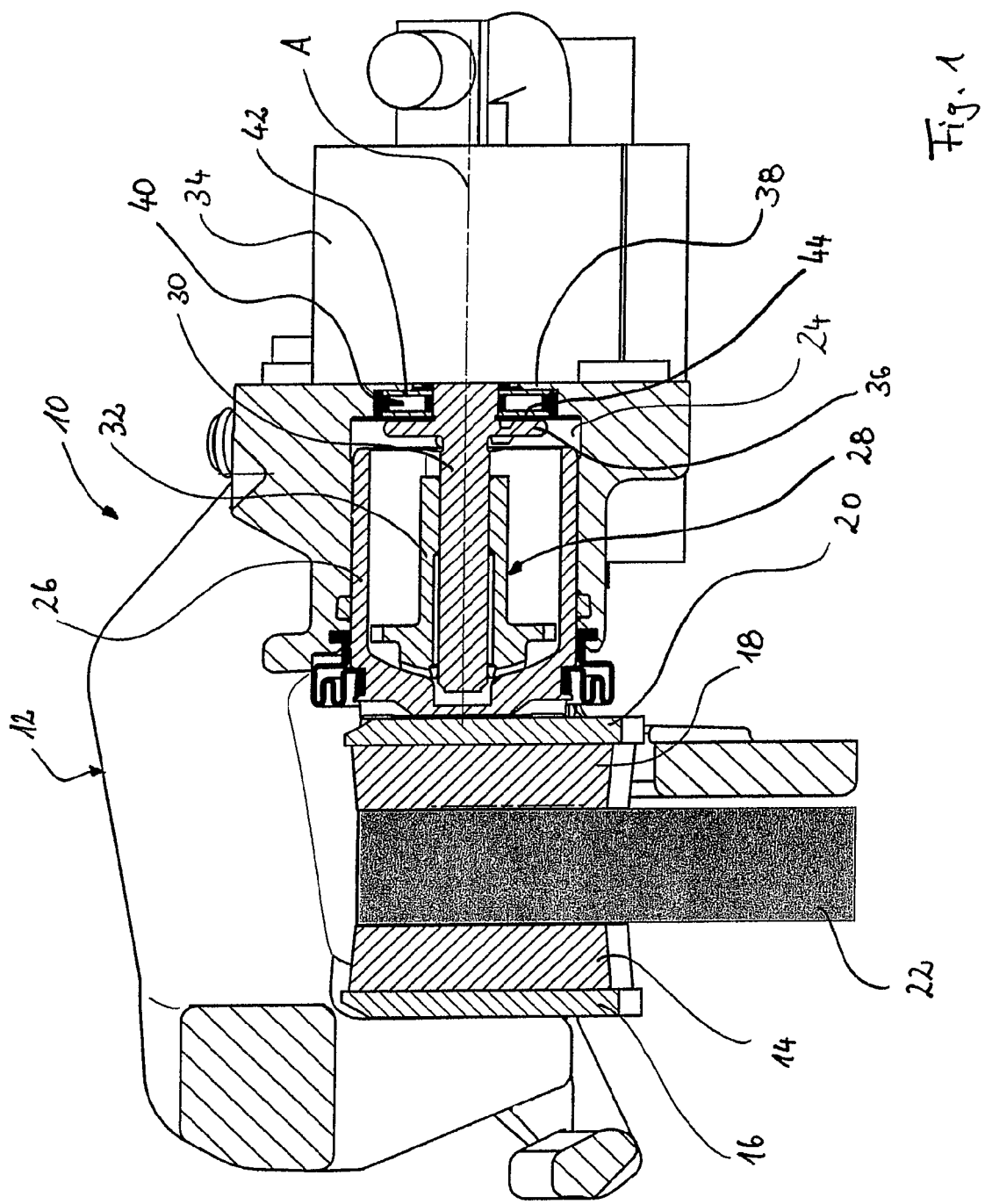
FIG. 1 represents a sectional view of a disc brake according to the invention and FIG. 2 represents a detail view of the housing of this disc brake.

A disc brake according to the invention is represented in section and generally marked by 10 in FIG. 1. This comprises a saddle-shaped housing 12 in which a first brake lining 14 is arranged on a brake lining support 16, which is mounted in a movable manner, and a second brake lining 18 is arranged on a brake lining support 20, which is likewise mounted in a movable manner. The two brake linings 14 and 18 are arranged on both sides of a brake disc 22 which is connected to a wheel, which is not shown, in a rotationally rigid manner. They are mounted according to the floating calliper principle, thereby guaranteeing that a braking clamping force is exerted on the brake disc 22 via the two brake linings 14 and 18 when the brake 10 is actuated. The operating principle of a brake disc of this kind according to the floating calliper mode is generally known and is not described in detail here.

A fluid chamber 24 is formed in the housing 12, which chamber can be charged with hydraulic pressure fluid via a fluid connection, which is not shown. A brake piston 26 is carried in the fluid chamber 24 so that it is movable in the direction of a longitudinal axis A. The brake piston 26 can be moved along the longitudinal axis A by charging the fluid chamber 24 with hydraulic fluid, in order thus to press the brake lining support 20 and the brake lining 18 onto the brake disc 22. This also takes place in a conventional manner in response to a brake pedal actuation or according to an electronic control program.

Also arranged inside the fluid chamber 24 is a nut-spindle arrangement 28 which comprises a spindle 30 which is rotatable yet fixed in the axial direction and a nut 32 which is in thread engagement with the latter. The spindle 30 can be rotatably driven by a motor via a drive device 34. The nut 32 thereupon moves in the axial direction to the left or the right in FIG. 1, according to the direction of rotation. The nut 32 is held in the piston 26 in a rotationally rigid manner. The mating pair of threads between the spindle 30 and the nut 32 is self-locking.

The spindle 30 comprises a support flange 36 which extends in the radial direction around the entire circumference of the spindle 30. A needle bearing 40 is provided between the support flange 36 and a housing collar 38. The needle bearing 40 comprises in a conventional manner needle-shaped rolling bodies which are arranged between two bearing rings 42 and 44.

The disc brake operates as follows. When service braking is carried out the fluid chamber 24 is charged with hydraulic fluid, so that the piston 26 is moved in the direction of the longitudinal axis A and a braking force is thus exerted on the brake disc 22 through the intermediary of the brake linings 14 and 18. At the end of braking the pressure in the fluid chamber 24 is reduced again, so that the piston 26 can move back into its starting position.

In a parking braking situation the piston 26 is likewise hydraulically biased until at least a clamping force which requires the parking braking force is obtained at the brake disc 22. Then, by rotatably driving the spindle 30 and moving the nut 32, the latter is brought into contact with the brake piston 26, so that this can be supported on the nut at the back, that is with its side which faces the fluid chamber 24. The nut in turn is supported via the self-locking mating pair of threads on the spindle 30 and the spindle 30 is supported via the thrust bearing 40 on the housing collar 38. The piston 26 is therefore blocked in a parking braking position.

It has become apparent in this connection that irregularities in the region of the support surface on the housing collar 38 can lead to a reduced service life of the thrust bearing 40, as this is loaded to differing degrees at certain points or in certain areas. In order to counter this problem, the housing 12 of the disc brake 10 comprises a support surface 46 (see FIG. 2) which extends in the radial direction over the section a. The support surface 46 is raised with respect to the surrounding housing region, that is it projects in the axial direction from the housing surfaces which surround it.

Figure 2:
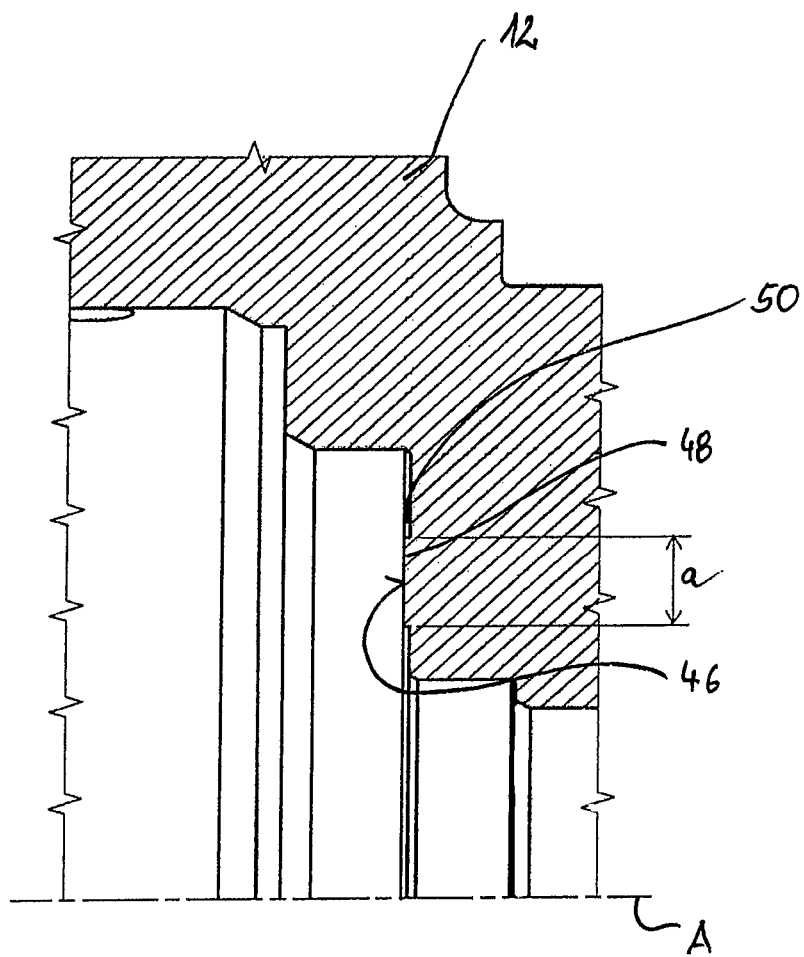

FIG. 2 shows a sectional view. It can be seen from this that the support surface bounds a projecting contact ring 48 of the housing 12. The support surface 46 is mechanically reworked, in particular by removing material, in order to improve its surface quality. Due to the projecting contact ring, an undercut 50 in the housing 12 is obtained. The bearing ring 42 of the antifriction bearing 40 can lie against the support surface 46 and be supported uniformly over the entire circumference.

Due to the uniform support of the bearing ring 42 on the support surface 46, the service life of the bearing arrangement 40 is significantly increased with respect to conventional configurations without a projecting defined support surface on account of the prevention of punctual load peaks at the bearing ring. This is due in particular to the fact that, on account of the regular support surface 42, a uniform load introduction into the thrust bearing is guaranteed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Disc brake for a motor vehicle having
a housing,
a piston which is movable in the housing along a longitudinal axis and
a nut-spindle arrangement which acts on the piston or can be brought into engagement with the piston,
wherein the nut-spindle arrangement is arranged in the housing and is workingly supported via a bearing arrangement on a support surface of the housing,
wherein the support surface is formed by a defined raised contact surface which projects in an axial direction with respect to adjacent surrounding housing regions spaced both radially inwardly and radially outwardly relative to the defined raised contact surface and wherein the defined raised contact surface extends in a radial direction over a section of a housing region located between the adjacent surrounding housing regions and against which the bearing arrangement lies; and
wherein the bearing arrangement comprises an axial thrust bearing configured to lie against the support surface with a bearing ring, wherein the bearing ring includes a first surface which lies directly against the support surface and an opposite second surface which lies directly against the bearing arrangement.

2. Disc brake according to claim 1,
wherein the support surface is formed by the end surface of a contact ring projecting from the housing in the axial direction or by a contact step.

3. Disc brake according to claim 2,
wherein the contact ring or the contact step is arranged adjacent to an undercut in the housing.

4. Disc brake according to claim 1,
wherein the bearing arrangement comprises an antifriction bearing.

5. Disc brake according to claim 4,
wherein the bearing arrangement comprises a roller, ball or needle bearing.

6. Disc brake according to claim 1,
wherein the bearing arrangement bears against the support surface with a bearing ring.

7. Disc brake according to claim 1,
wherein the support surface is the same size as a surface of the bearing ring which faces the support surface.

8. Housing for a disc brake according to claim 1,
characterised by a support surface for a bearing arrangement, wherein the support surface is formed by a defined contact surface which projects with respect to an adjacent housing region and against which the bearing arrangement bears.

9. Disc brake according to claim 1, wherein the support surface is smaller than a surface of the bearing ring which faces the support surface.

10. A housing adapted for use in a disc brake comprising:
a generally saddle-shaped housing having a support surface for supporting a bearing arrangement of the disc brake,
wherein the support surface is formed by a defined raised contact surface which projects in an axial direction with respect to adjacent surrounding housing regions spaced both radially inwardly and radially outwardly relative to the defined raised contact surface and wherein the defined raised contact surface extends in a radial direction over a section of a housing region located between the adjacent surrounding housing regions and against which the bearing arrangement lies, wherein the bearing arrangement is configured to lie against the support surface with a bearing ring, the bearing ring including a first surface which lies directly against the support surface and an opposite second surface which lies directly against the bearing arrangement.

11. Disc brake for a motor vehicle having
a housing,
a piston which is movable in the housing along a longitudinal axis and a nut-spindle arrangement which acts on the piston or can be brought into engagement with the piston,
wherein the nut-spindle arrangement is arranged in the housing and is supported via a bearing arrangement on a support surface of the housing,
wherein the support surface is formed by a defined raised contact surface which projects in an axial direction with respect to adjacent surrounding housing regions spaced both radially inwardly and radially outwardly relative to the defined raised contact surface and wherein the defined raised contact surface extends in a radial direction over a section of a housing region located between the adjacent surrounding housing regions and against which the bearing arrangement lies
wherein a bearing ring is disposed between the bearing arrangement and the support surface whereby the bearing arrangement lies against the support surface via the bearing ring;
wherein the bearing ring includes a first surface which lies directly against the support surface and an opposite second surface which lies directly against the bearing arrangement.

12. Disc brake according to claim 11,
wherein the support surface is formed by the end surface of a contact ring projecting from the housing in the axial direction or by a contact step.

13. Disc brake according to claim 12,
wherein the contact ring or the contact step is arranged adjacent to an undercut in the housing.

14. Disc brake according to claim 11,
wherein the support surface is the same size as a surface of the bearing ring which faces the support surface.

15. Housing for a disc brake according to claim 11.

16. Disc brake according to claim 11,
wherein the support surface is smaller than a surface of the bearing ring which faces the support surface.

17. Housing according to claim 10,
wherein the bearing arrangement comprises an axial thrust bearing.

18. Disc brake according to claim 11,
wherein the bearing arrangement comprises an axial thrust bearing.

* * * * *